United States Patent
Cheng et al.

(10) Patent No.: US 10,574,536 B2
(45) Date of Patent: Feb. 25, 2020

(54) CAPACITY ENGINEERING IN DISTRIBUTED COMPUTING SYSTEMS

(71) Applicant: MICROSOFT TECHNOLOGY LICENSING, LLC, Redmond, WA (US)

(72) Inventors: Zhao Cheng, Bellevue, WA (US); Muhammad Muntazir Mehdi, Redmond, WA (US); Nikolaj Skallerud Bjorner, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/059,398

(22) Filed: Aug. 9, 2018

(65) Prior Publication Data

US 2019/0268234 A1   Aug. 29, 2019

Related U.S. Application Data

(60) Provisional application No. 62/636,105, filed on Feb. 27, 2018.

(51) Int. Cl.
*H04L 12/24* (2006.01)
*H04L 12/751* (2013.01)
*G06F 9/50* (2006.01)

(52) U.S. Cl.
CPC ............ *H04L 41/12* (2013.01); *G06F 9/50* (2013.01); *H04L 41/0803* (2013.01); *H04L 41/0823* (2013.01); *H04L 41/142* (2013.01); *H04L 41/147* (2013.01); *H04L 41/16* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 2008/0207200 A1* | 8/2008 | Fein | H04B 1/38 455/426.1 |
| 2010/0061231 A1* | 3/2010 | Harmatos | H04L 45/02 370/228 |
| 2017/0373943 A1* | 12/2017 | Goel | H04L 41/145 |
| 2018/0026850 A1 | 1/2018 | Obregon et al. | |
| 2018/0109424 A1 | 4/2018 | Krishnaswamy et al. | |

FOREIGN PATENT DOCUMENTS

| | | |
|---|---|---|
| WO | 2016083841 A1 | 6/2016 |
| WO | 2017007727 A1 | 1/2017 |

OTHER PUBLICATIONS

"International Search Report And Written Opinion Issued In PCT Application No. PCT/US19/018379", dated May 22, 2019, 15 Pages. (MS# 404038-WO-PCT).

* cited by examiner

*Primary Examiner* — Shripal K Khajuria
(74) *Attorney, Agent, or Firm* — Workman Nydegger

(57) ABSTRACT

Improved network optimization and scaling are provided by combining optimization of traffic engineering and network topologies. Sets of minimal link capacities are determined based on the constraints of network topology, network demand, and failure modes. The optimization problem is reframed to allow for simultaneous optimization across all failure modes, reducing or eliminating overprovisioning in link capacity allocation by utilizing convex optimization solvers and techniques.

20 Claims, 7 Drawing Sheets

CAPACITY ENGINEERING IN DISTRIBUTED COMPUTING SYSTEMS

CROSS-REFERENCE TO RELATED APPLICATIONS

This application claims the benefit of and priority to U.S. Provisional Patent Application Ser. No. 62/636,105, filed on Feb. 27, 2018, and entitled "CAPACITY ENGINEERING IN DISTRIBUTED COMPUTING SYSTEMS," which application is expressly incorporated herein by reference in its entirety. This application is also related to U.S. patent application Ser. No. 15/292,902, filed on Oct. 13, 2016, and entitled "APPARATUS, METHOD, AND MANUFACTURE FOR CLOUD NETWORK UPDATING," which is also expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections describe, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" describes systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Traffic engineering is often used to build and update computing networks, such as used in the aforementioned cloud scenarios, as well as other computing environments, but much less attention has been paid to the topology design of such networks. Given the exponential growth in traffic, where each year's traffic or network demand is greater than that of the past ten years, topology is a key factor in providing cloud network services. When factoring the hundreds of millions of dollars spent on laying intercontinental fiber lines, optimal topology design can provide huge savings and help meet the ever-increasing demand. Since traffic engineering is still a major issue, there is an ongoing need for facilitating the design, configuration, and optimization of computing systems and particularly in ways that simultaneously account for both traffic engineering and network topology. Due to the growth of such networks, there is also a need for automated systems that can analyze and update the networks in an automated fashion.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to methods, systems and storage devices for automating the scaling and updating of network configurations.

In some embodiments, a nested optimization system and method are presented that combine the constraints of both the traffic engineering and network topology. This problem is sometimes referred to as capacity engineering. Traffic demand, skeleton topologies, and failure modes are provided as input. This input is processed by a computing system to generate output comprising a set of minimal link capacities that meet all the demand across the failure modes given the topology and which can be used to manually or automatically configure/reconfigure a network topology.

In some instances, the reconfiguration of the network topology is performed dynamically in response to real-time updates and in a manner that enables the network to respond to changes in network demand, failure scenarios, and other network topology changes. The disclosed embodiments can also be used to provide automated network optimization and scaling.

In some instances, the disclosed embodiments utilize improved algorithms based on convex optimization techniques that can also be used to help avoid over-provisioning and iterative non-convex or greedy processes that might otherwise be required for other (non-convex/greedy) approaches.

In some disclosed embodiments, a computing system performs automated network optimization and scaling by performing a method that includes acts for obtaining network topologies, failure modes, and network demand. An algorithm is then applied to determine the optimal set of minimal link capacities for the available network topologies constrained by the failure modes and network demand. In some embodiments, this includes comparing various network topologies to determine the best topology for a given scenario and updating a network based on the output of the algorithm and repeating the process based on various conditions or criteria, such as changes in available network topologies, increases in network demand, or passage of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
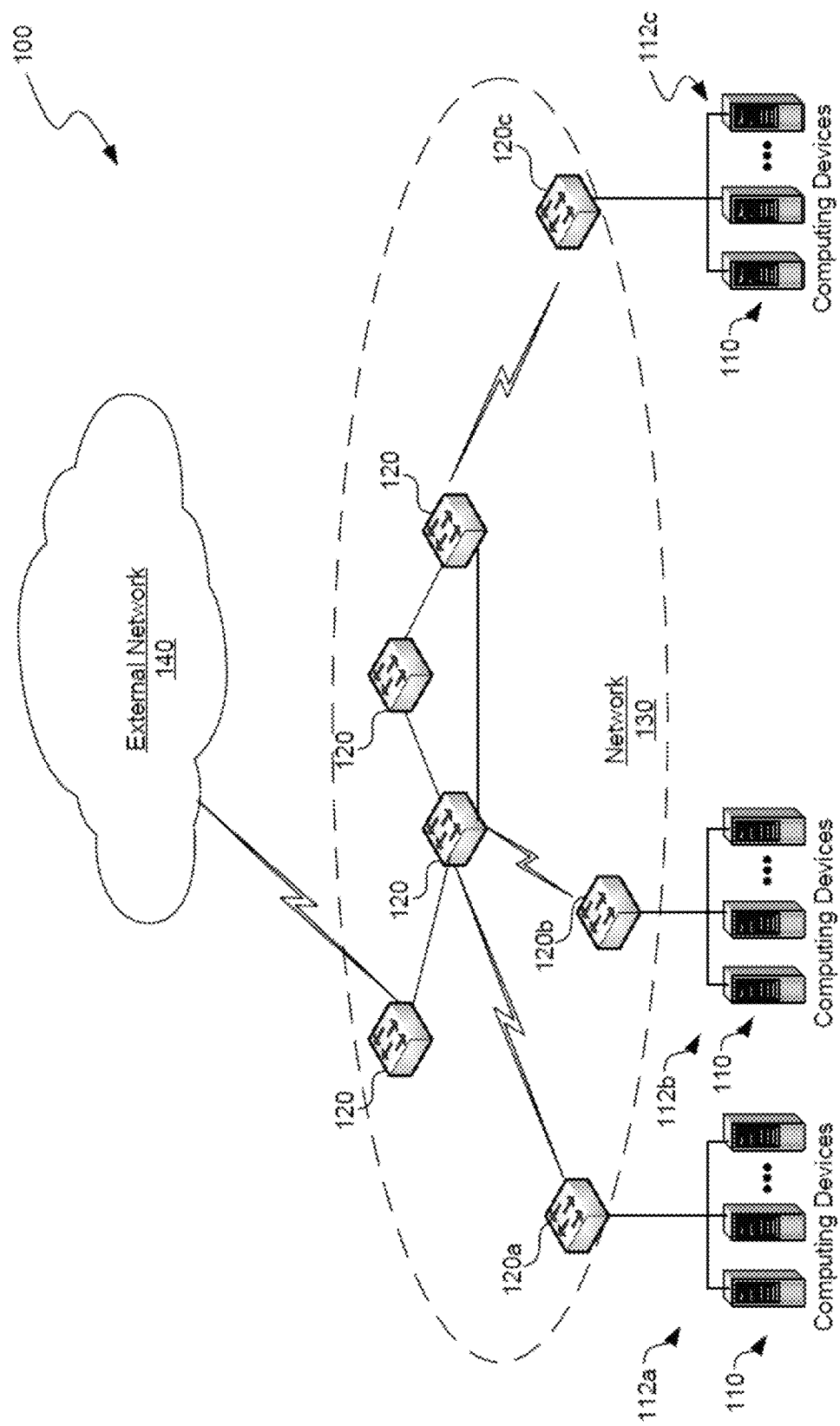
FIG. 1 illustrates a block diagram illustrating one example of a suitable environment in which aspects of the technology may be employed.

Briefly stated, the present technology is generally directed to updating a cloud network. This technology may include generating a set of inequalities-based network topology information, shared risk link group information, demand information, and traffic solver parameters. The set of inequalities may also be based upon a model of traffic routing that is based on selection of routes based on dynamic and global traffic engineering. A capacity plan may also be generated based on the set of inequalities and at least one objective. The capacity plan may include a target capacity for each link of the plurality of links in the network. The network may be updated based on the capacity plan. After the updating, each link of the plurality of links in the network may have an updated capacity that corresponds to the target capacity. In this way, at least the capacity of at least one of the links of the plurality of links in the network is increased based on the capacity plan.

In some examples, the present technology may be used to grow, scale, or update a network, such as a global cloud network that links various data centers to one another. In some examples, the network is a software-defined network (SDN). In this and other examples, the present technology may be used to optimize network design and network growth. For example, this technology may be used to build a growing cloud network that is resilient to changes in the presence of dynamic changes in a network, such as outages and fluctuations, and to ensure performance and fault resilience under service level agreement (SLA) requirements, while reducing cost associated with the over-provisioning of links.

In some instances, the disclosed embodiments provide technical advantages over other capacity engineering technologies by at least simplifying the processes required to determine link capacities and/or by reducing the overprovisioning of the link capacities in the engineered networks.

The following discussion includes references to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Computing Environment(S)

The disclosed embodiments may include or be implemented by a computer system including one or more processors and computer-readable storage devices such as computer memory. In particular, the computer memory may store computer-executable instructions that when executed by one or more processors cause various functions to be performed, such as the acts recited in the embodiments.

Embodiments of the present invention may comprise or utilize a special purpose or general purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa).

For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown).

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communication between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Computing System for Cloud Network Updating

Figure 2:
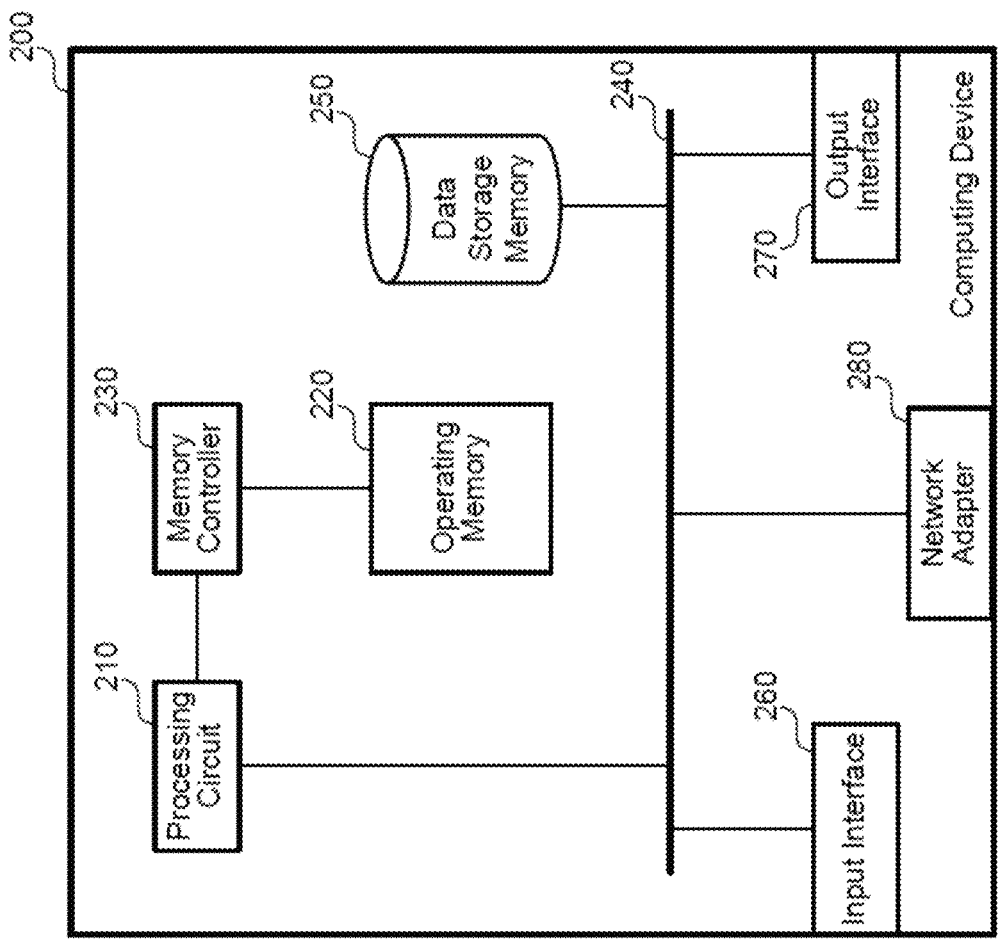
FIG. 2 illustrates a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the computer system configurations listed above. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage medium," throughout the specification and the claims whether used in the singular or the plural, is defined herein so that the term "processor-readable storage medium" specifically excludes and does not encompass communications media, any communications medium, or any signals per se. However, the term "processor-readable storage medium" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one storage memory (e.g. data storage memory 250), at least one operating memory (e.g., operating memory 220) and at least one processor (e.g., processing unit 210) that are respectively adapted to store and execute processor-executable code that, in response to execution, enables computing device 200 to perform actions, such as, in some examples, the actions of process 490 of FIG. 4, as discussed in greater detail below.

Figure 3:
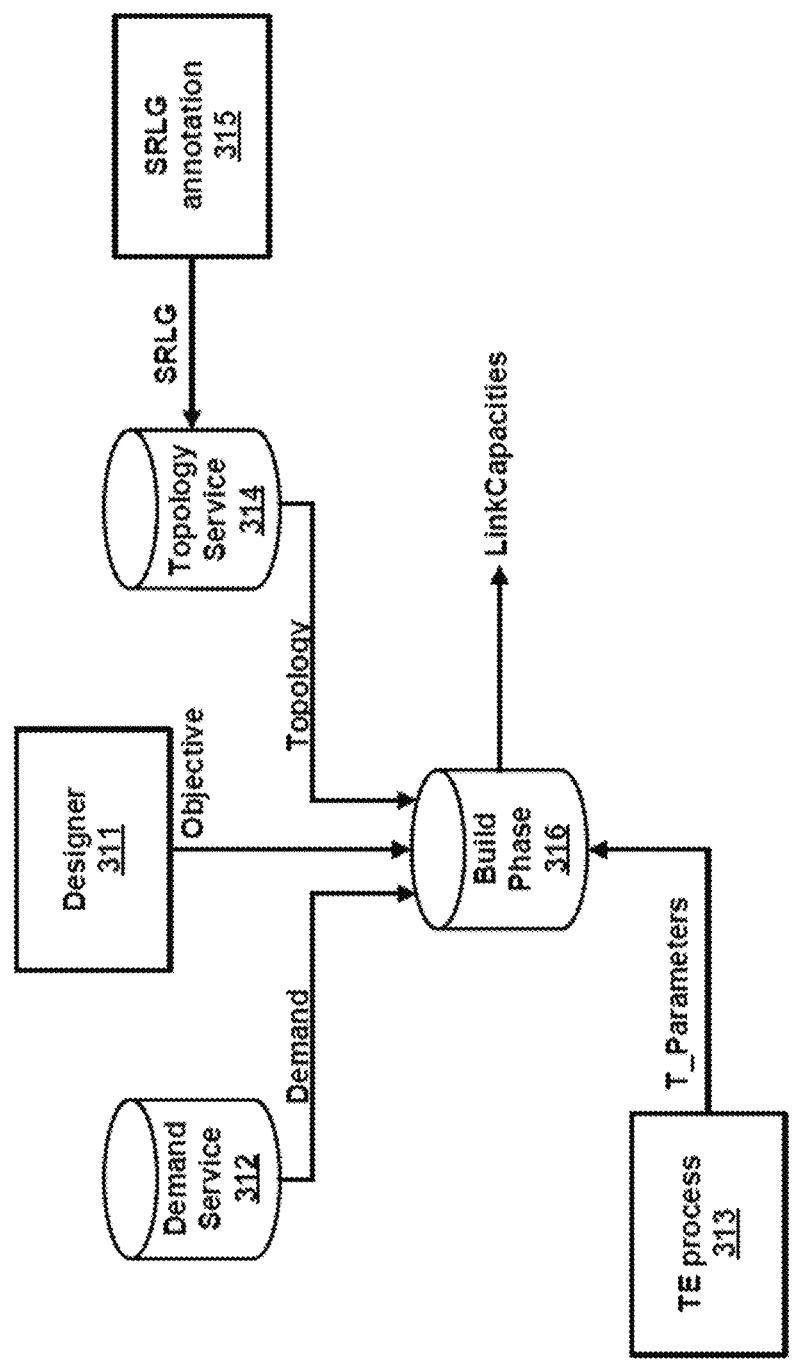
FIG. 3 illustrates a block diagram illustrating an example of a system for cloud network updating.

FIG. 3 is a block diagram illustrating an example of a system (300) for cloud network updating. System 300 includes designer 311, demand service 312, traffic engineering (TE) process 313, topology service 314, shared risk link group (SRLG) annotation 315, and build phase 316.

Figure 4:
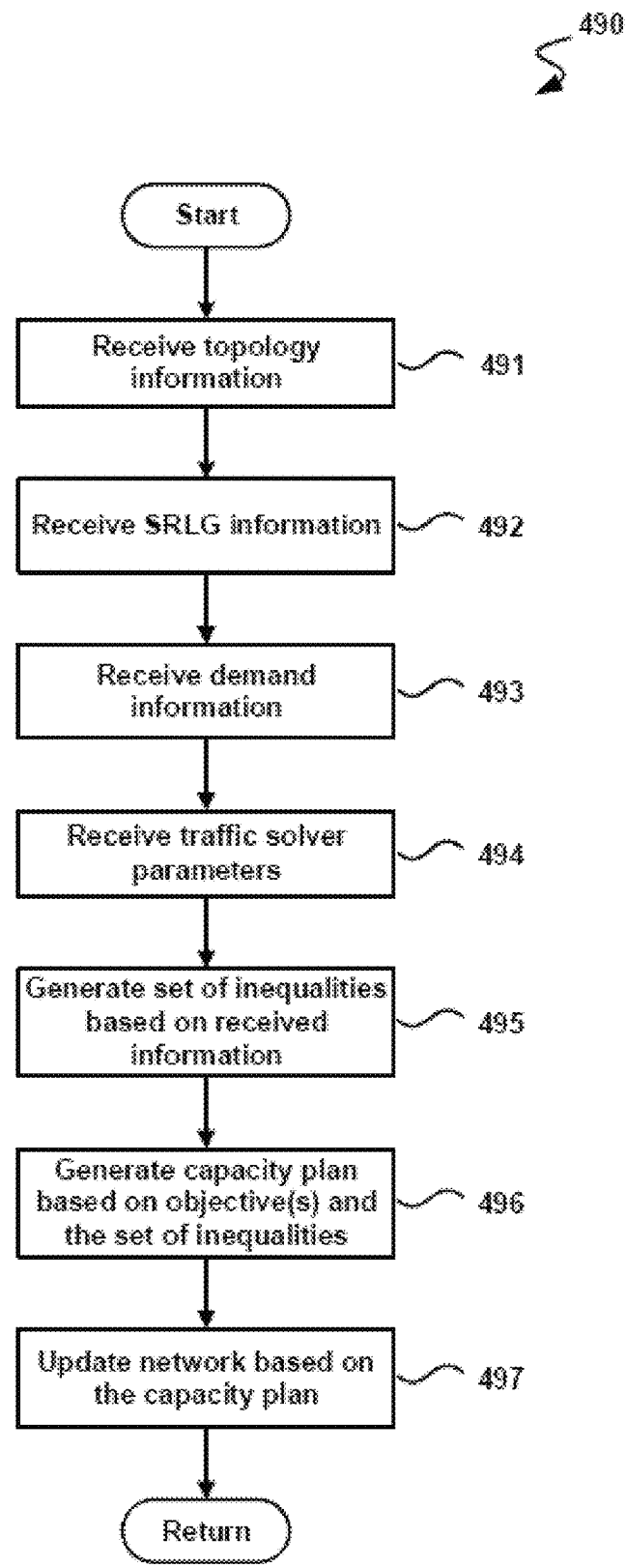
FIG. 4 illustrates a logical flow diagram illustrating an example of a process for cloud network updating, in accordance with aspects of the present disclosure.

FIG. 3 will be further discussed in conjunction with FIG. 4.

Cloud Network Updating

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a processor-implemented process. As an alternate example, these processes may be encoded as processor-executable instructions and transmitted via a communications medium.

FIG. 4 is a logical flow diagram illustrating an example of process 490 for cloud network updating, in accordance with aspects of the present disclosure.

In some examples, process 490 is performed for growing a network. The network includes a plurality of links, with each link having a capacity. In some examples, the network is a global cloud network with links on a data-center-to-data-center scale. In some examples, the network is a software-defined network (SDN).

In some examples, process 490 may be used to optimize network design and network growth. Process 490 may be used to build a growing cloud network that is resilient to changes in the presence of dynamic changes in a network, such as outages and fluctuations, and to ensure performance and fault resilience under service level agreement (SLA) requirements, while reducing cost, such as the cost associated with the over-provisioning of links.

After a start block, the process proceeds to block 491. At block 491, network topology information is received. For instance, in some examples, build phase 316 receives topology information Topology from Topology Service 314.

In some examples, the topology information is or includes a directed graph that includes a representation of a set of physical routers and links comprising the network and the topology information for the physical routers and links encoded as the domains Node and Links. In some example, the topology information is a text file. In other examples, the topology information is another suitable format.

The process then moves to block 492. At block 492, shared risk link group information is received. In some examples, Topology Service 314 receives shared risk link group information SRLG from SRLG annotation 315, and Topology Service 314 in turn provides the SRLG information to build phase 316.

In some examples, the SRLG information includes a collection of shared risk groups associated with the physical network layout of the network. In one example, a shared risk link group is a group of links that may all fail at once if one link of the group of links fails. For example, a set of logical devices that have at least one physical device in common may all fail at once if the physical device is taken off-line. Such a set of logical devices therefore constitute a shared risk link group. Accordingly, in some examples, the shared risk link group information includes information about groups of logical links in the network in which each logical link in the group of logical links corresponds to the same physical link.

The process then advances to block 493. At block 493, demand information is received. The demand information is based on network bandwidth demand in the network. In some examples, the demand information Demand is received by Build Phase 316 from Demand Service 312. Demand Service 312 may include bandwidth brokers. In some examples, the demand information is a demand matrix for the network, where the demand matrix is the set of bandwidth demands for the network. In some examples, each demand of the demand matrix is defined as a source/destination pair node and a number indicating the amount of traffic requested for a flow.

In some examples, the demand information includes multiple traffic matrices of future forecasted traffic matrices. In some examples, the demand forecast is based in part on analytics and business needs. In some examples, the demand is defined as a worst-case or near worst-case scenario, such as peak traffic demand, or 95th percentile peak traffic demand. In this way, during the build phase, the network design is done in accordance with traffic in worst-case or near-worst case scenarios so that the network is built to handle such traffic scenarios. In some example, the demand information is a text file. In other examples, the demand information is another suitable format. In some examples, as discussed above, the demand information includes future forecasts of bandwidth demand for the network.

The process then proceeds to block 494. At block 494, traffic solver parameters for the network are received. In some examples, traffic solver parameters T_Parameters are received by Build Phase 316 from Traffic Engineering (TE) process 313.

In some examples, one of the parameters is K, which represents the number of simultaneous link failures for which the network is designed to cope with. The parameter K may be one part of the SLA which the network should meet. That is, among other things, in some examples, process 490 ensures that the network can withstand K link failures. In some examples, K is two. In other examples, K is a positive integer other than two.

In some examples, there are two modes of providing inputs, such as the inputs provided in steps 491-494. In one mode, each input is provided to Build Phase 316 by a separate service, such as topology information Topology provided topology service 314 and demand information Demand provided by Demand service 313. In another mode, designer 311 designs future networks for future demands, and provides various inputs for Build Phase 316.

The process then moves to block 495. At block 495, a set of inequalities is generated based on the network topology information, the shared risk link group information, the demand information, and the traffic solver parameters. The set of inequalities is based upon a model of traffic routing that is based on selection of routes based on dynamic and global traffic engineering. The traffic engineering is global in that a centralized global process is used to find the best routes considering the entire global network. The traffic engineering is that dynamic in that it responds to dynamic changes in the network in real time.

In some examples, the set of inequalities include a link inequality for each link, and a path inequality for each path that can be taken by each demand.

In some examples, the following inequalities are used:

| | |
|---|---|
| $sf(d) \leq d.\text{demand}$ | for all d in DM |
| $u(l) \leq l.\text{capacity}$ | for all l in Links |
| $0 \leq \text{flow}(p)$ | for all p in Paths |

In this example:

The flow function 'flow: Paths→Number' takes a path and allocates a flow (a number).

Link={src:Node, dst:Node, capacity:Number}

A link has a source and destination node, and bandwidth capacity.

Paths=Link*

A path is a sequence of links such that the destination of the i'th link is the source of the i+1'st link.

Demand=src:Node, dst:Node, demand:Number

DM=Demand Matrix=set of Demands for different source/destination pairs.

Solutions to flow(p) are used to define auxiliary measures sf(d) and u(l), where sf(d) is the sum of flows per demand, and u(l) is the link utilization for link l:

sf(d):=Sum of flow(p) such that end-points of p.src=d.src, p.dst=d.dst u(l):=Sum of flow(p) such that p contains link l.

The process then advances to block 496. At block 496, a capacity plan is generated based on the set of inequalities and at least one objective. The capacity plan includes a target capacity for each link of the plurality of links in the network. In some examples, Build Phase 316 outputs the capacity plan as LinkCapacities.

In some examples, link capacity is defined as a step function of 100 gigabits per second. In other examples, the link capacity is quantified in other ways.

An explanation of the generation of the capacity plan is described in greater detail below. A summary explanation of the generation of the capacity plan is as follows.

In some examples, minimal cost is employed as the sole objective or as one of the objectives. More specifically, in some examples, a goal of network optimization for capacity planning is to find the minimal capacity improvement, that meets a set of demands under failure scenarios that may occur with non-negligible probability. In some embodiments or examples, the minimal capacity improvement is the minimal cost capacity improvement. In various examples, other objectives may include reducing latency, increasing reachability, and increasing availability.

In some examples, each failure scenario is looped over and the equations are solved for each failure scenario. In other examples, a robust optimization problem is set up that solves for all of the failures at once.

The network performs routing based on global controllers that perform routing based on dynamic traffic engineering and on a global basis. When building the capacity plan, the model of traffic engineering used in the global controllers is emulated so that traffic scenarios will be routed in a matter similar to the actual routing done in real time. Accordingly, building of the capacity plan is performed in conjunction with a global scheduler to determine where the flow will traverse on the network using dynamic traffic engineering and on a global basis under various fault and traffic scenarios. The generation of the capacity plan includes various fault scenarios, meaning a variety of scenarios involving outages and other disruptive network problems and network failures. The generation of the capacity plan includes various traffic scenarios, meaning variations in the quantity and location and type of traffic flow. In some examples, the modeling of the routing is based upon worst case aggregate demand.

In some examples, building the capacity plan includes incorporating fault models for networks using synthetic fault modeling with fault-diagnostic fault scenarios. In particular, in some examples, the fault modeling is based on probabilistic modeling and shared risk groups as well as incorporating temporal and stochastic network load models that cover sets of demand scenarios. Also, in some examples, the solution space is restricted to the solution space of software-defined networking controllers to the network optimizer. By restricting the solution space of the network optimizer to the space used by the dynamic controllers, the method is able to generate only solutions that are of use when the network operates in response to dynamic scenarios.

In some examples, generating the capacity plan includes performing a solution for network optimization based on the set of inequalities and the objective(s) based on failure models, utilization forecasts, and the solution space for dynamic traffic engineering. The set of paths preferred by the dynamic traffic engineering solutions is used as a starting point for network optimization under the sets of fault and demand scenarios used to generate the solution. In some examples, failure scenarios used for the generation of the capacity plan may be event log based on vendor scenarios, and the like.

Generation of the capacity plan uses principles of dynamic traffic engineering, but is different in that dynamic traffic engineering uses the traffic and demand parameters as they exist in real time. In contrast, generation of the capacity plan uses the same principles as in dynamic traffic engineering, but uses them over sets of faults and demand scenarios to determine the capacity required in each link under worst-case scenarios. However, because dynamic and global traffic engineering principles will be used in the actual traffic routing, overall link capacity needed will be less than if such principles were not used, and the generation of the capacity plan reflects scenarios that are worst case but based on dynamic and global traffic engineering, so that capacity is not needlessly added to meet SLAs.

For example, if K=2 (i.e., a network that is guaranteed to operate when there are two link failures), without using global engineering principles in the capacity planning, it would be necessary to have three times capacity on each and every path, so that if two paths go down, the third would take over. However, the global engineering approach takes into account all possible combinations of ways to get from a source to a destination, to provide end-to-end failover. The capacity planning takes this into account as well, and the proper necessary capacity for each link is calculated considering all possible combinations of ways to get from a source to a destination.

In some examples, generation of the capacity plan while modeling the dynamic traffic engineering solves includes using path-based network flow constraints that capture the solution space of dynamic traffic engineering solvers that at any time is provided with a set of preferred (shortest/cheapest) paths for each route. In some examples, the capacity plan generation also includes flow-preservation based constraint modeling, which restricts the set of routers instead of the set of paths in the solution space. Such constraints capture a potentially larger solution space of paths and are suitable to engineering networks over sets of traffic engineering solutions using long-term traffic engineering. In some examples, the capacity plan generation also includes techniques that produce feasible linear problems by approximating fault scenarios, and techniques that solve max/min objectives directly using general search techniques.

The primal/dual optimization theory can be expressed as a compact linear program, which takes into account the bandwidth broker capability to introduce flexibility into the traffic matrix. In some examples, greedy iterative procedural processes for optimization are used in this context, as well as approximation methods using linear-programming duality and a form of quantified constraint formulation is used that is amenable to optimal solving modulo quantifier reasoning and non-convex optimization. A greedy procedural process is a procedural process that makes the locally optimal choice at each stage in order to find a global optimum. In some examples, a symbolic optimization solver is used to handle combinations of linear inequalities over real numbers and either logical combinations of such inequalities or mixed integer linear programming inequalities.

In performing the solution for the capacity plan generation, network engineering constraints are formulated. In some examples, the first formulation of the network engineering constraints is based on a fault model under static rerouting. This scenario targets the immediate recovery of routing under abrupt network failures. In this case, rerouting is not instantaneous and the network relies on already available tunnels to recover from outages and meet SLAs. In some examples, the second formulation targets recovery scenarios that accommodate rerouting across a space of possible routes that can be dynamically configured.

The specific details of one example of generating the capacity plan based on the set of inequalities and the objective(s) is described as follows.

As previously discussed, the set of inequalities may be based on the following:

| | |
|---|---|
| sf(d) ≤ d. demand | for all d in DM |
| u(l) ≤ l. capacity | for all l in Links |
| 0 ≤ flow(p) | for all p in Paths |

An objective function for maximizing throughput is Sum sf(d) for d in DM. When a throughput is fixed, other objective functions can be formulated, such as minimizing maximal link utilizations and giving preference to solutions that distribute flow evenly. The set of links, their capacities, and latencies may be fixed in a given deployment.

In some examples, the capacity plan is generated based on determining the minimal capacity improvement, that meet a set of demands under failure scenarios that may occur with non-negligible probability. In some embodiments, the minimal capacity improvement is the minimal cost capacity improvement.

For simplification of an example process, generation of a capacity plan involving single demand matrix DM is described in the next example.

With an objective to minimize a function delta: Link→Number and flow, flow: Demand→Number, such that for every probable failure scenario fail: Link→Bool, the cost of increasing link capacity with amount delta is minimized. Schematically, in this example, the objective is:

```
min delta
    max fail
        min flow
            of Cost(delta):
                PATH-FLOW
                u(l) ≤ l.capacity + delta(l)    for all l in Links
                PossibleFailure(K, fail)
                if fail (l) then u(l) ≤ 0       for all l in Links
``` using the previously described constraints, which will be referred to as PATH-FLOW:

| | |
|---|---|
| sf(d) ≤ d. demand | for all d in DM |
| 0 ≤ flow(p) | for all p in Paths | and where PossibleFailure(K, fail) constrains the failure scenarios that can be considered probable.

For example, with K link failures, then PossibleFailure(K, fail) is defined as "(Sum of fail (l) for all l in Links)≤K". If $l_1, l_2, \ldots, l_n$ are the links belonging to a shared risk group, then the conjunction fail $(l_1)$ && fail $(l_2)$ && && fail $(l_n)$ is added as a disjunction to PossibleFailure(K, fail).

In this example, the objective Cost(delta) is a function of the delta capacity. In some examples, the cost function is a linear function of delta that takes the cost of delta to be proportionate to the length of a link. Accordingly, Cost(delta):=Sum of length($l$)*delta($l$) for all $l$ in Links In some examples, Cost(delta) is a step function based on delta; with capacity added in discrete increments and for each increment the cost is increased by the same amount. Such costs may be expressed using mixed integer linear programming constraints. This formulation fixes a set of paths a priori and only considers flows through the fixed set of paths. This formulation is suitable for optimizing capacity planning in the presence of a TE solver that evenly distributes routes over a fixed set of Paths. Failure recovery over Paths does not immediately require intervention by the TE solver, as the capacity delta calculated by this objective is sufficient over the paths presented to the TE solver.

Alternatively, in some examples, network flow preservation is enforced on each node. In this formulation it is convenient to fix a subset of relevant nodes for each demand. The set of relevant nodes for a given demand can be taken as the set of nodes on the shortest paths (up to a threshold length) between the end-points of a demand. The relevant nodes are referred to herein using the function relevant: Demand→Node-set. In this examples, instead of solving for flows a utilization function util: Demand x Link→Number is solved. Accordingly, to solve this problem according to one example, first, the flow constraints are defined as follows.

| | |
|---|---|
| u(l) := d. demand | for all d in DM, for all l in Links |
| 0 ≤ util(d, l) | for all l in Links, d in DM |
| u(l) ≤ l. capacity + delta(l) | for all l in Links |
| inflow(d, n) + Sum of util(d, l) | for all l in Links such that l. src = n |
| = outflow(d, n) + Sum of util(d, l) | for all l in Links such that l. dst = n |
| For all d in DM, n in relevant(d) | |
| where | |
| inflow(d, n) := if d. src = n then d. demand else 0 | |
| outflow(d, n) := if d. dst = n then d. demand else 0 | |

These flow constraints are referred to herein as NODE-FLOW. Accordingly, the capacity planning problem under K failures may be defined as:
min delta

```
    max fail
        min flow
            of Cost(delta):
                NODE-FLOW
                    u(l) ≤ l.capacity + delta(l)    for all l in Links
                PossibleFailure(K, fail)
                    if fail (l) then u(l) ≤ 0       for all l in Links
```

In the following, FLOW refers to either NODE-FLOW or PATH-FLOW, and FLOW-SCENARIOS refers to:

```
    FLOW
        u(l) ≤ l.capacity + delta(l)    for all l in Links
    PossibleFailure(K, fail)
        if fail (l) then u(l) ≤ 0       for all l in Links
```

A greedy approximation procedural process may be obtained by enumerating each failure scenario that satisfies PossibleFailure(K, fail) and incrementing the value of delta with the minimal amount in each round. In some examples, this greedy approach requires a number of optimization constraint solving calls as the number of different solutions to PossibleFailure(K, fail) and generally computes an over-approximation of delta. In some examples, semantically, the greedy over-approximation operates as follows:
$delta_0(l) := 0$ for all l in Links
for each scenario fail, s.t. PossibleFailure(K, fail):
    minimize Cost(delta):

```
            FLOW-SCENARIOS
                delta_0(l) ≤ delta(l)    for all l in Links
                delta_0(l) := delta(l)   for all l in Links
```

Linear inequality systems, and generally many convex optimization problems over real numbers may entail strong duality of linear programming. Convex optimization generally refers to the optimization of convex functions over convex sets. For example, an inner-most maximization objective may be replaced by a minimization objective after rewriting inequalities. In this context, failure scenarios generally cause the optimization problem to be non-convex so that strong duality does not hold, and an approximation may be obtained (e.g., the minimal solution may be greater than or equal to the maximal solution of the dual system). Also, after dualizing inequalities subject to a subset of variables, a non-linear system may be obtained.

The problem may be directly solved optimally by computing in stages increases of the flow in each subsequent scenario.

In some examples, a solution to the optimality problem can be described as a flat optimization criterion modulo quantified constraints. For instance:

```
min Cost(delta)
    for all fail:
        exists flow:
            if PossibleFailure(K, fail) then
                FLOW,
                u(l) ≤ l.capacity + delta(l)    for all l in Links
                if fail (l) then u(l) ≤ 0       for all l in Links
``` or alternatively:

```
min delta, flow, fail
    of Cost(delta) :
        FLOW-SCENARIOS(delta, flow, fail)
            for all fail', delta', flow':
                if FLOW-SCENARIOS(delta', flow', fail') and
Cost(delta')>Cost(delta)
                    then
                        exists flow'': FLOW-SCENARIOS(delta, flow'',
                            fail')
```

Either formulation may be solved using quantifier elimination followed by non-convex optimization on the resulting quantifier-free constraints. In some examples, a method that interleaves optimization and quantifier elimination may be used to solve either formulation.

In some examples, network optimization in the face of distributions of demands, or multiple demands, DM1, DM2, . . . , has associated objective:

```
    min delta
        max fault, demand DM in DM1, DM2, ...
            min flow
                of Cost(delta):
                    FLOW-SCENARIOS(delta, flow, fail)
``` where DM is implicit in FLOW-SCENARIOS.

The capacity plan is generated based on set of inequalities and one or more objectives using one or more of the methods described above.

The process then proceeds to block 497. At block 497, the network is updated based on the capacity plan. The network is updated such that each link of the plurality of links in the network has an updated capacity that corresponds to the target capacity. The capacity of at least one of the links of the plurality of links in the network is increased based on the capacity plan.

The capacity plan defines the capacity that each link should have when the network is updated. In some examples, because the network already exists, the capacity for each link defined in the capacity plan will be equal to or greater than the current capacity of the link, because when the network is updated, each link will either be left as it is or capacity will be added to the link.

The process then moves to a return block, where other processing is resumed.

In some examples, after the network is updated, the process will be iterated again, this time based on the updated network. In this way, the network will continue to grow over time.

In some examples, process 490 optimizes the layout of the physical network with respect to costs and performance guarantees, and process 490 applies to configuring network routing that is resilient to the presence of dynamic changes in a network, such as outages and fluctuations in demands. The network is dynamically optimized using traffic engineering tools that select routes based on global optimization constraints. By exposing the optimization objectives to the network design layer, process 490 tunes the layout of networks for performance and utilization, guides network provisioning, and ensures cost and performance guarantees including K and service level agreements (SLAs), using, among other things, received information about the physical constraints. SLAs require sustained performance of the key metrics under conditions of K failures. Use of process 490 to update the network may save hundreds of millions of dollars relative to other technologies while providing the same level of performance including K and service level agreements by avoiding unnecessary over-provisioning of links.

After the network is updated, the network operates in real time, with traffic routing performed by global controllers on a global basis and performed dynamically.

The capacity planning and traffic engineering is accordingly performed as a two-phase process. The first phase is the capacity planning, which is performed offline to generate the capacity plan. The capacity planning phase is performed relatively infrequently, such as every few days. The second phase is online and comprises of changing traffic splits across tunnels in response to changes in traffic demands, failures, and the like. The capacity of each link is fixed to the actual capacity of the link during the online phase, whereas the capacities are variable (but are, at minimum, the actual capacity) in the offline phase. During the first phase, the demand is forecast demand, wherein in the second phase, the demand is actual demand, or prediction of demand over the next 15 minutes, or the like.

The online phase may be done relatively frequently and is computationally cheap (e.g., a simple linear program), but the flexibility may be limited by the number of tunnels, and may be limited to moving traffic across tunnels. Since the flexibility in the of the online phase may be limited, in some examples, the precomputation of tunnels needs to be done carefully in a manner that considers different failure and traffic demand scenarios. In this way, in some examples, the precomputing of tunnels is robust to traffic demands, while factoring in the (limited flexibility) in adjusting traffic online in response to a given traffic matrix of new demands.

The offline phase may use n time windows, over, for instance, 18 or 20 or 24 months. In one example, each time the build plan is used, 24 snapshots of the future network are generated, one for one month in the future, another for the two months in the future, and so on, so that the 24th snapshot is 24 months in the future. The snapshots are updated each month based on the actual month as it was updated based on the previous snapshot for each month. As the future view becomes present, the view is fed into the next, and the offline phase moves into the next set of months, which creates a kind of feedback loop of future views becoming the present network, as a rolling process.

The offline phase includes a process for validating the files for each of the n time windows. In some examples, each capacity plan file is validated by running simulations of actual traffic engineering on each capacity plan file to validate the capacity plan file, so that multiple layers of validation are provided. In this way, in some examples, a plurality of capacity plans is generated including the capacity plan, such that each capacity plan of the plurality of capacity plans corresponds to a different future date. In some of these examples, the network is updated when each future date becomes the present date over time and a new plurality of capacity plans is generated each time the network is updated based on the updated network as a rolling process of updating the network.

Although various examples discuss the use of process 490 to update a network, process 490 may also be used in the initial build of the network, in which case the minimum capacity of each link is one since there are currently no actual links.

Network Optimization and Scaling System

Figure 5:
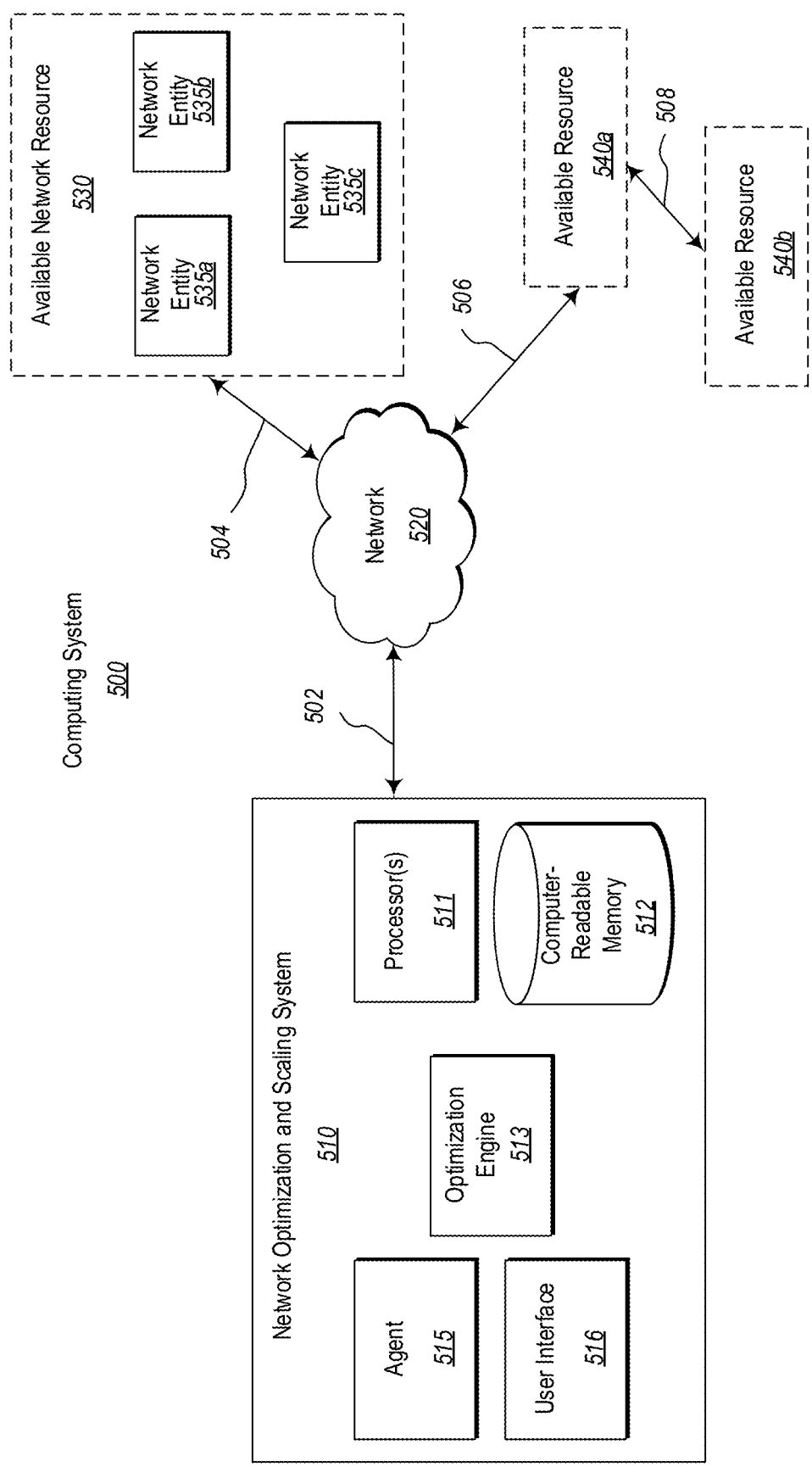
FIG. 5 illustrates one embodiment of a computing system that can be used to implement the disclosed methods for performing network optimization and scaling.

FIG. 5 depicts a block diagram for a computing system 500 comprising a network optimization and scaling system 510 that is connected to a network 520 to be optimized with one or more available network resources (e.g., available network resource 530 and available resources 540*a* and 540*b*).

The network optimization and scaling system 510 has processor(s) 511, computer-readable memory 512, an optimization engine 513, an agent 515, and a user interface 516. In some embodiments, the computer-readable memory 512 contains instructions that are executed by the processor(s) 511 to perform various functions, including the methods and techniques disclosed herein.

The optimization engine 513 is configured to perform some or all of the steps of the network optimization techniques described herein, such as embodiments of cloud network updating as described above, or embodiments of general or automated network optimization and scaling, as described below. As an example, in some embodiments, the optimization agent 513 determines network resources required for network 520 to meet network demand or failure modes given one or more possible network topologies.

Agent 515 is configured to communicate optimization parameters and instructions along network channel 502 between the network optimization and scaling system 510 and network 520. In some embodiments, agent 515 receives parameters of network 520 for use in optimization engine 513. In some embodiments, parameters of network 520 include one or more network topologies, such as the network topology of network 520 or potential network topologies based on a combination of network 520 and available network resource 530 or available resources 540*a* and 540*b*.

In some embodiments, agent 515 provides the output of optimization engine 513 to the network 520. In some embodiments, when agent 515 provides the output of optimization engine 513 to the network 520, agent 515 also instructs or provides instructions to network 520 for requisitioning, requesting, or otherwise obtaining additional network resources, such as available network resource 530 or available resources 540*a* and 540*b* and which are, in some instances, operable to trigger the automated performance of those functions. In some embodiments, agent 515 also sets or updates link capacities in network 520.

User interface 516 is configured to provide information to a user and to allow the user to input certain commands. In some embodiments, the commands (when entered at interface 516) set parameters or otherwise control optimization engine 513 or agent 515. In some embodiments, user interface 516 provides information to a user about the output of optimization engine 513 or instructions that agent 515 wants to provide to network 520. In some embodiments, the commands that the user is allowed to input relate to such information and allow a user to customize or approve the output or instructions sent to network 520 before they are sent by the agent.

Network 520 is any kind of network, such as a cloud network, a wide-area network, a wireless network, an ad hoc network, a distributed network, or any similar typical network of devices, such as the examples described above. In some embodiments, network 520 has connections to other systems, such as network channel 502 to a network optimization and scaling system 510, network channel 503 to available network resource 530, and network channel 506 to available resource 540*a*. Network channels 502, 504, and 506, as well as network channel 508 connecting available resources 540*a* and 540*b*, are representative of wireless, wired, or other connections between systems and networks, such as those described above. The network channels are configured to provide communication and data transmission between the network/systems. The embodiment depicted in FIG. 5 is exemplary and should not, therefore, be seen as limiting the number of network channels that can be connected to network 520, nor should it be seen as limiting the number of other resources or systems that are or can be connected to network 520.

Network 520 has a network topology that describes the components, systems, and connections contained therein. Network 520 is comparable to network 130 depicted in FIG. 1. In some embodiments, network 520 is a network 130, as described above.

Available network resource 530 is a network like network 520, but which is not currently incorporated into or otherwise controlled as part of or by network 520. Network entities 535a, 535b, and 535c are representative of components, devices, or systems that are part of network 530. In some embodiments, at least one of network entities 535a, 535b, and 535c comprises a network node, such as one of the network nodes shown in FIG. 1 (e.g., 120, 120a, 120b, 120c). Available network resource 530 can also be a network like external network 140 in FIG. 1. In some embodiments, available network resource 530 is identical to external network 140, as described above.

Available resource 540a and 540b are components, devices, or systems that are not part of another network, but which are like the components, devices, or systems that make up network 520 or available network resource 530, including network entities 535a, 535b, and 535c. Network connection 508 is exemplary of the fact that network 520 may be connected to an available resource 540a, which is in turn connected to an available resource 540b, where available resources 540a and 540b are not part of a single network, such as available network resource 530. While all possible configurations are not depicted, the current configuration is meant to be representative of some of the various connections that can exist, such as an available resource being connected to another available network resource and vice versa. In some embodiments, available resources 540a and 540b can be components, devices, or systems such as those described (above) as part of external network 140 depicted in FIG. 1.

As will be explained in more detail below, available network resource 530 and available resource 540a and 540b are exemplary of networks, components, systems, and devices that are included in possible network topologies that are analyzed by network optimization and scaling system 510, or in some embodiments, by optimization engine 513. In some embodiments, when optimization engine 513 determines that additional network resources are required for network 520, in order to meet network demand or failure modes for network 520, optimization engine 513 generates a notification of the same that is sent to agent 515.

In one example, agent 515 responds to the notification by generating instructions that are used to cause network 520 to incorporate, for example, available network resource 530 and available resource 540a into network 520 to create an updated network that meets the network demand or that compensates for the failure modes. In some embodiments, the notification is first presented to a user via user interface 516. The user is provided options to review, approve, or modify the corresponding instructions sent by the agent 515 to the network 520.

The methods and techniques used by the network optimization and scaling system 510 are sometimes described as cloud network updating methods and systems and may include embodiments of the systems described in FIGS. 2 and 3 for practicing process 490 of FIG. 4, for example. In other embodiments, the methods and techniques used by the network optimization and scaling system 510 are described in reference to FIGS. 6 and 7 as general or automated network optimization and scaling. Those skilled in the art will appreciate that some configurations will be capable of practicing any combination of the disclosed cloud network updating and related network optimization and scaling.

General Network Optimization and Scaling Method

Figure 6:
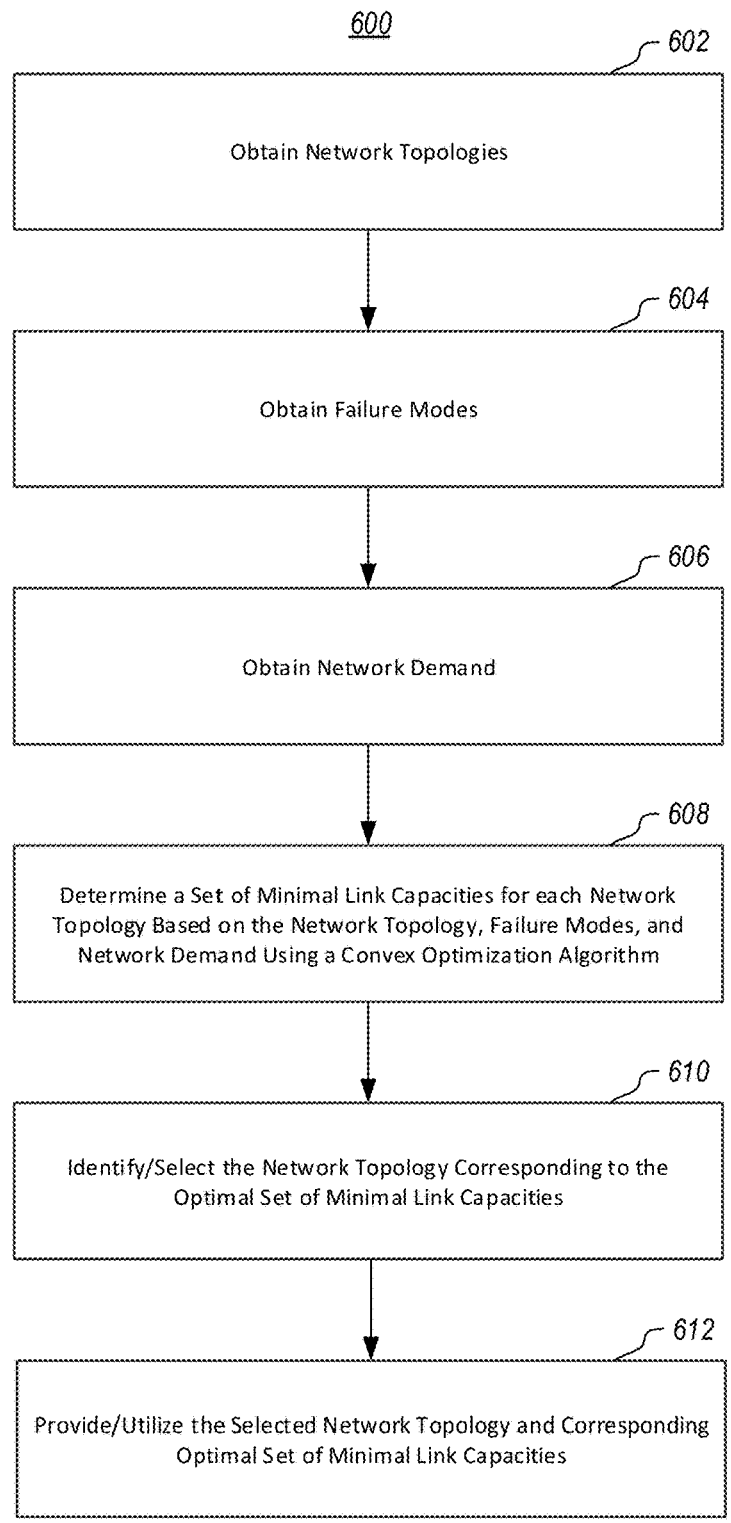
FIG. 6 illustrates a flowchart of methods associated with the disclosed methods for performing general network optimization and scaling.

FIG. 6 depicts a flowchart 600 of acts associated with methods for performing network optimization and scaling and represents a type of nested optimization of topology design and traffic engineering. In some embodiments, the disclosed methods are applied to cloud wide area networks, such as described in reference to FIGS. 1 and 5.

The disclosed methods take network topologies, failure modes, and network demand as input and then provide a set of minimal link capacities as output that will allow a network to configure/reconfigure the network to provide service according to the requirements of the failure modes and network demand within the corresponding network topology and, sometimes, in real-time to dynamically respond to changing network demands.

In some embodiments and in some aspects, the methods shown with regard to the flowchart 600 of FIG. 6 are similar to the processes described in reference to FIG. 4. However, the network optimization and scaling performed in association with FIG. 6 varies from the embodiments described in reference to process 490 in several ways and which can be used, in some instances, to provide improved performance, as will become apparent from the following disclosure.

The first acts shown in flowchart 600 include an act of obtaining network topologies (act 602), obtaining failure modes (act 604), and obtaining network demand (act 606). These three acts can be performed in any order, including concurrently.

The act obtaining network topologies (act 602) refers to calculating, determining, generating, receiving, downloading, accessing, or otherwise obtaining sets of one or more topologies that describe interconnections in a network, for example, network 520 in FIG. 5. These network topologies are similar to or identical to those described above for FIGS. 2-4.

The act of identifying topologies (602) is generally equivalent to the act of receiving topology information, which is described above for block 491 of FIG. 4. In some embodiments, the sets of network topologies received in act 602 can be described by a number of edges and nodes, with nodes representing devices or systems and edges representing links or connections between them, each link having its own capacity. In some embodiments, a network topology can be represented using graph theory to describe the edges and nodes or an approximation thereof that is equivalent for the purposes of network optimization and scaling.

Each network topology that is obtained for the set of network topologies (act 602) describes a certain configuration for a network. For example, with reference to network 520 of FIG. 5, a set of different network topologies can be obtained/identified (act 602). These topologies could include, for instance, a first network topology that describes the entirety of network 520, while a second network topology might describe only a subset of network 520, omitting some elements that cause the first network topology to be distinguished from the second network topology. In another example, a third network topology might include network

520 and available network resource 530, connected by network channel 504, while a fourth network topology might comprise the third network topology in addition to available resource 540*a* and network channel 506. The set of network topologies might include any combination of two or more network topologies for a given network.

In some embodiments, the act of obtaining network topologies (act 602) can include accessing stored topology data structures that define the network topologies. In other embodiments, the act of obtaining the network topologies includes analyzing the available network resources and developing the set of stored topology data structures.

In some embodiments, at least one network topology is composed of at least some components or sets of components that match common design patterns and that are associated with simplified/consolidated network topology representations of the corresponding network elements (e.g., entities, nodes, links, edges, vertices, connections, etc.). When a common design pattern is detected, the disclosed act of obtaining the network topologies (act 602) further includes, in some instances, obtaining an unmodified topology having the common design pattern and generating a corresponding modified topology representation that includes fewer total network elements than the unmodified topology representation by at least replacing the common design pattern with a corresponding consolidated network element. This can facilitate the application of the convex optimization techniques described below and by at least reducing the quantity of calculations that must be performed.

The next act, for obtaining failure modes (act 604), refers to calculating, determining, generating, receiving, downloading, accessing, or otherwise obtaining one or more failure modes for a network or network topology. In some embodiments, the failure modes obtained are a set of failure modes for a network to be optimized. In some embodiments, the failure modes are a set of failure modes for a specific network topology that is to be analyzed. Each set of failure modes describes how links and devices in a network or network topology can or do fail. In some embodiments, this is a likelihood of failure. In some embodiments, failure modes include or describe business rules for a network and how it must operate. In some embodiments, these business rules are based on network user or network provider requirements. For example, in some embodiments, a business rule is a number of failures that a network or network topology must be able to cope with. For example, in some embodiments, a failure mode describes that a network must be resilient to one failure. In other embodiments, a failure mode describes that a network must be resilient to two failures.

The failure modes include shared risk link groups (SRLG) and related information, as described above in FIGS. 2-4 and more specifically in block 492 of process 490 in FIG. 4. The failure modes also include traffic solver parameters obtained in block 494 of FIG. 4, such as traffic solver parameter K described above. Thus, act 604 performs a similar function to blocks 492 and 494, as described above, with the modifications or additions as described herein.

The traffic solver parameters included in failure modes, in some embodiments, are based, at least in part, on the service level agreement. In some embodiments, the traffic solver parameters are based at least part on network demand. In some embodiments, the traffic solver parameters are fixed values that an optimized network must meet based on the definition of the network. In some embodiments, the traffic solver parameters are variable. In some embodiments, the traffic solver parameters vary based on historical data. In some embodiments, the traffic solver parameters vary based on anticipated, estimated, or otherwise determined future needs.

The SRLGs are used to model failure scenarios to capture the set of all possible network failures and their combinations. The risk groups in the SRLGs are abstractions of physical failure scenarios. For example, a single physical L1 layer failure is reflected in a set of logical L3 layer failures.

In some embodiments, SRLGs use edge labeling functions that capture or model the fault scenarios by modeling each edge or link as a real number between zero and one. The value reflects the fragment or fractional value of capacity remaining on the edge or link in a given failure scenario, with a one being no lost capacity and zero being no remaining capacity or complete failure of the connection. A risk group is defined as $rg:E \rightarrow [0, 1]$ and e is the edge in question. Thus, for an unaffected link, $rg(e)=1$ and for a severed link, $rg(e)=0$. For an edge e with capacity $e_c$, the capacity of the edge in a risk group rg is $e_c \cdot rg(e)$. Risk groups can also be extended into vertices or nodes. The node failure is represented as a failure along all edges connected to the node. Risk groups are closed under unions in the sense that $rg_{12}(e)=rg_1(e) \cdot rg_2(e), \forall e \in E$, reflecting a model of the effect of simultaneous failures. This allows a set of all risk groups for a network or network topology to be represented as the SRLG.

Turning now to obtaining network demand (act 606), this act refers to calculating, determining, generating, receiving, downloading, accessing, or otherwise obtaining the network demand for a network or network topology. In some embodiments, network demand is the demand information described in FIGS. 2-4, most specifically, demand information as received in block 493 of process 490 in FIG. 4. In some embodiments, network demand describes the link capacity that network or network topology must support. In some embodiments, network demand is an end-to-end value that covers a subset of a network or network topology. In some embodiments, network demand is a value for individual links. In some embodiments, network demand is between specific devices, vertices, or nodes in the network or network topology. In some embodiments, network demand is an overall capacity demand for a network or network topology broken down to capacities for systems, devices, vertices, nodes, links, channels, or connections. In a mathematical or data structure sense, in some embodiments, the network demand is expressed as a matrix of non-zero real values representing demand, with the matrix mapping vertices or edges of a network or network topology to those values.

After obtaining the network topologies, failure modes, and network demand, the computing system generates or determines a set of minimal link capacities, or capacity plan, for each network topology based on that topology, the failure modes, and the network demand using a convex optimization algorithm (act 608). While act 608 serves similar functionality to the functionality associated with elements 495 and 496 of process 490, namely, it can be used to help obtain minimal link capacities and capacity plans, it does it in a different way.

Unlike the processes performed by elements 495 and 496, the current embodiment includes modifying the underlying optimization problem or objective to make it convex. For instance, as disclosed above, the optimization used in process 490 is a non-convex problem and is solved using a greedy algorithm. By making the objective convex, convex solvers can be used and dual approximations are also possible, which is not possible with the non-convex approaches. It will be appreciated that the current convex embodiments may utilize either simplex optimizations or dual-simplex optimizations, as well as other convex solvers.

The convex solutions described in the current embodiments are also distinguished from the greedy approaches described in reference to process 490, inasmuch as the algorithm utilized for process 490 must iterate over each failure scenario and update the capacities needed at each iteration, which is not required for the convex solutions. This is an important distinction over the greedy approaches. In particular, the greed approaches can sometimes (although not necessarily) result in an over-approximation of the necessary capacity in links. Even worse, in some instances, the greedy approaches can actually allocate capacities to links that are only available in one failure scenario and overprovision the network by the number of SRLGs. The use of the convex solutions mitigates this potential problem and represents, therefore, a technical advantage over greedy algorithm approaches.

In the new approach, the convex problem is expanded to conjoin all the risk groups in the SRLGs for the different flows, wherein the flows are paths in the network topology for a given set of failure scenarios. The capacities for all failure scenarios can then be calculated in a single convex calculation, thereby resulting in minimal link capacities that are optimal under all constraints without the risk of over-provisioning and without requiring the iterative processes described in reference to FIG. 4.

The optimization is performed for each network topology and finds the optimal set of minimal link capacities for that network topology and the associated failure modes and network demand. In some embodiments, there is a single network topology and only a single set of minimal link capacities is found. In other embodiments, there are more than one network topologies as part of a set of network topologies, and the algorithm finds the optimal set of minimal link capacities for each as discussed. The result or output is then a group of sets of minimal link capacities, where each set of minimal link capacities in the group of sets of minimal link capacities corresponds to one of the network topologies in the set of network topologies. In some embodiments, each set of minimal link capacities is an optimized set of minimal link capacities, in the sense that the set of minimal link capacities is optimized for the corresponding network topology and associated failure scenarios and network demand.

Attention is now turned to identifying and selecting the network topology corresponding to the optimal set of minimal link capacities (act 610). In embodiments where there is only a single network topology being analyzed or optimized, this is essentially a trivial step of identifying or selecting the set of minimal link capacities associated with that single network topology. In embodiments with a set of network topologies, this act identifies and selects a single set of minimal link capacities and the corresponding network topology as the optimal one based on one or more predetermined optimality criteria. In some embodiments, at least one of the criteria is a rule or a constraint on the set of minimal link capacities, and identifying and selecting the optimal set of minimal link capacities includes comparing each set of minimal link capacities to the at least one criterion or each other set of minimal link capacities according to the rule or constraint.

In some embodiments, at least one of the criteria is a rule or constraint on the network topologies in the set of network topologies and identifying and selecting the optimal set of minimal link capacities includes comparing each network topology corresponding to a set of minimal link capacities to the at least one criterion or each other network topology according to the rule or constraint.

In some embodiments, the rule or constraint of at least one of the one or more predetermined optimality criteria is to select the minimal cost network topology. In some embodiments, the minimal cost refers to the financial cost of implementing the network topology. In some embodiments, identifying and selecting the optimal set of minimal link capacities is performed by obtaining, calculating, determining, receiving, accessing, or otherwise finding the cost associated with implementing each network topology and each cost associated with a network topology is compared to the others to find the minimum value. The network topology with the minimal cost value is identified and selected and the optimal set of minimal link capacities corresponding to that network topology is also identified and selected.

The final act illustrated in the flowchart 600 comprises the computing system providing/utilizing the selected network topology and corresponding optimal set of minimal link capacities (act 612). In some embodiments, providing/utilizing the selected network topology and corresponding optimal set of minimal link capacities includes storing the information in a data storage device or computer-readable media.

In some embodiments, providing/utilizing the selected network topology and corresponding optimal set of minimal link capacities includes sending the information to a device, system, or user.

In some embodiments, providing/utilizing the selected network topology and corresponding optimal set of minimal link capacities includes presenting the information to a user, such as with interface 516. Then, the user then has the option to approve or modify the information before it is applied or further used to configure/reconfigure a network.

In some embodiments, providing/utilizing the selected network topology and corresponding optimal set of minimal link capacities is performed by an agent such as agent 515, as described above, and the agent provides the information or instruction relating to the information to a network, such as network 520, to modify, update, optimize, or scale the network and the associated link capacities in the network.

In some embodiments, providing or utilizing the selected network topology and corresponding optimal set of minimal link capacities is equivalent or similar to updating a network based on a capacity plan as discussed above as block 497 of process 490.

While the network optimization and scaling described in flowchart 600 may be performed for an actual network, utilizing actual hardware settings with real systems and networks, such as those depicted in FIG. 5, it will be appreciated that the foregoing acts may also be performed entirely in a simulated software defined environment, wherein the various network topologies and network elements (e.g., failure modes, network demand, minimal link capacities, etc.) are only virtual/simulated and not representative of actual hardware elements that are currently in use.

Then, upon performing the network optimization and scaling with the simulated elements, the various optimized topologies (once approved) can be applied in the actual hardware.

Automated Network Optimization and Scaling Method

Figure 7:
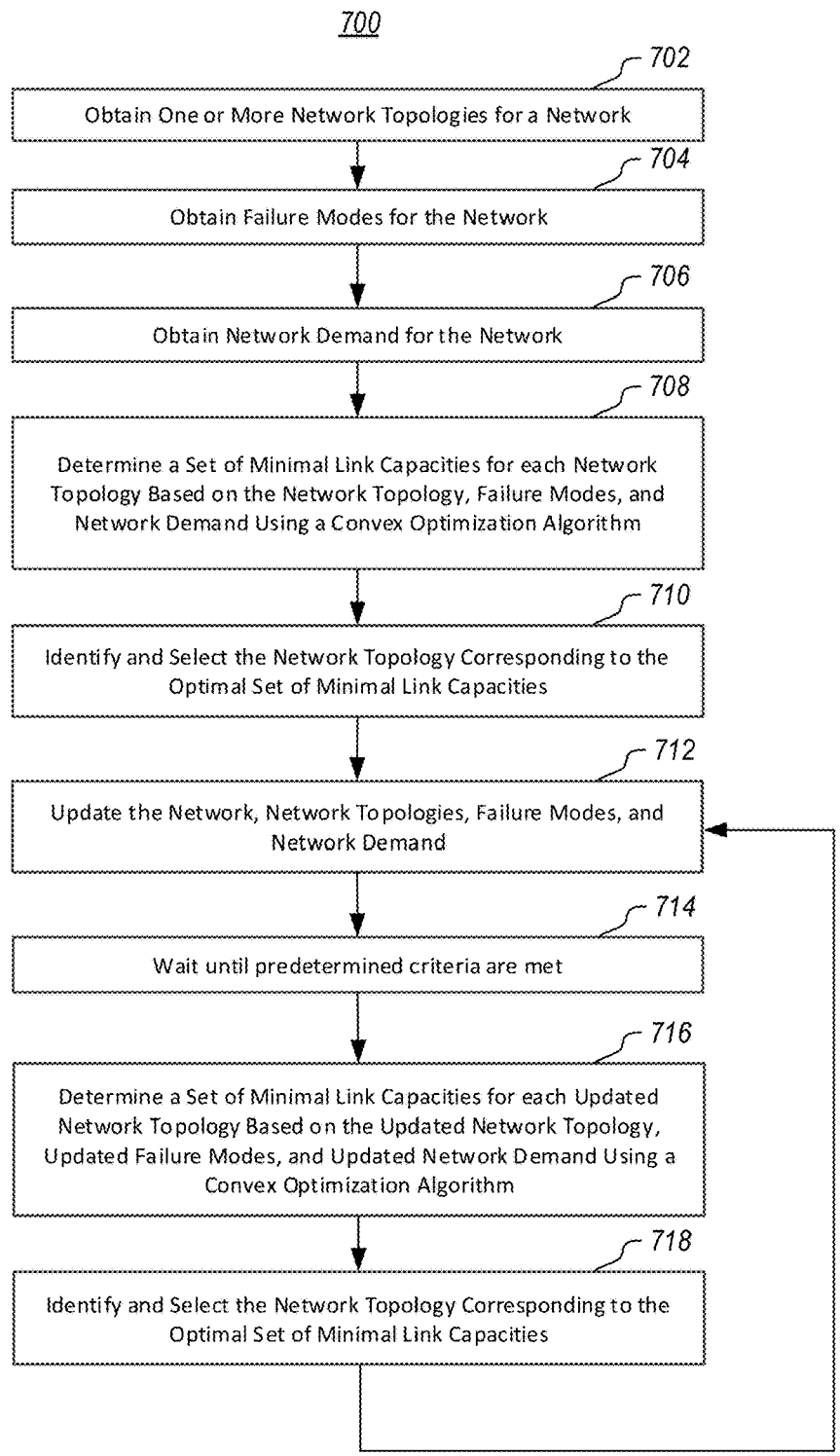
FIG. 7 illustrates a flowchart of methods associated with the disclosed methods for performing automated network optimization and scaling.

FIG. 7 depicts another flowchart 700 that includes acts associated with methods for practicing automated network optimization and scaling. The automated network optimization and scaling methods associated with flowchart 700 are related to, but distinguished from the embodiments described in reference to process 490 and the flowchart 600.

As shown, and as described further below, the methods shown in flowchart 700 are similar to the methods shown in flowchart 600, except that the act of providing/utilizing the selected network (612) in flowchart 600 is replaced by a series of other acts in the flowchart 700, which can provide additional functionality, such as (in some instances) improved automation. Although, it will be appreciated that in some instances, the methods described in reference to the flowchart 700 can also require some user input, in which case the associated methods are only semi-automated.

As shown, the first five acts of the flowchart 700 (acts 702, 704, 706, 708 and 710) are the same as the first five acts of flowchart 600 (acts 602, 604, 606, 608 and 610). Accordingly, detailed descriptions of those acts (acts 702, 704, 706, 708 and 710) will not be provided at this time, inasmuch as the descriptions provided in reference to acts 602, 604, 606, 608 and 610 apply.

Next, after the network topologies are identified and selected (corresponding to the optimal set of minimal link capacities), the computing system performs a process of updating the network, network topologies, failure modes and network demand (act 712).

The updating of the network involves changing the network to match the identified and selected network topology. In some embodiments, updating the network also includes updating the allocated link capacities of the network to match the optimal set of minimal link capacities corresponding to the identified and selected network topology.

In some embodiments, updating the network involves adding, requisitioning, incorporating, or otherwise acquiring additional network resources into the network. For example, in some embodiments, updating the network is the incorporation of available network resource 540 into network 520 as described above for FIG. 5. In other embodiments, updating the network is the removal of network resources from the network based on the identified and selected network topology.

In some embodiments, updating the network includes waiting for one or more predetermined criteria, such as passage of a certain amount of time, completion of an optimization step, such as act 710 described above or act 718 described below, a user input, or other triggers. For example, in some embodiments, updating the network requires a user input or approval, for example, through user interface 516 as described above for FIG. 5.

Updating the network topologies involves, in some instances, updating the baseline network topology that is used in the set of network topologies to the network topology of the updated network. This updated baseline network topology can then be used as the network topology for the updated network and has the characteristics described above for network topologies in act 702. In some embodiments, updating network topologies also includes identifying new network topology configurations that may be possible based on the updated baseline network topology and available resources that are or could be connected or incorporated into the updated network, for example, available network resource 540 or available resource 540b as discussed and depicted in FIG. 5.

In some embodiments, at least one aspect of updating network topologies includes waiting for one or more predetermined criteria, such as passage of a certain amount of time, a periodic trigger, receipt of new information, connection of a new device or system to a network, availability of a new link, completion of an optimization step, such as act 710 described above or act 718 described below, a user input, or other triggers. For example, network topologies may update upon the condition that new available network resources or available resources connect to or otherwise become available to the updated network.

Updating the failure modes involves updating the failure modes based on the identified and selected network topology and corresponding set of minimal link capacities. In some embodiments, updating the failure modes is based at least in part on a user input.

In some embodiments, updating failure modes includes waiting for one or more predetermined criteria, such as passage of a certain amount of time, a periodic trigger, receipt of new information, connection of a new device or system to a network, availability of a new link, completion of an optimization step, such as act 710 described above or act 718 described below, a user input, or other triggers. For example, an update may occur to the number of link failures that a network is expected to withstand. In some embodiments, updating the failure modes results from a user input, for example, through user interface 516 depicted in FIG. 5.

Updating network demand involves updating the network demand based on the identified and selected network topology and corresponding set of minimal link capacities. In some embodiments, the network demand is updated based at least in part on a user input. In some embodiments, the network demand is updated based at least in part on an analysis of historical network demand.

In some embodiments, updating network demand includes waiting for one or more predetermined criteria, such as passage of a certain amount of time, a periodic trigger, receipt of new information, connection of a new device or system to a network, availability of a new link, completion of an optimization step, such as act 710 described above or act 718 described below, a user input, or other triggers. For example, in some embodiments, upon passage of a certain amount of time, network demand is updated at least based on historical network usage during the certain amount of time. In some embodiments, network demand is updated based at least in part on an estimate of future network demand.

In some embodiments, updating the network, network topologies, failure modes, and network demand occurs over a period of time based on varying predetermined criteria for each aspect of the update.

The updating of the network, network topologies, failure modes, and network demand must necessarily be completed to allow for act 716, described below. Thus, in some embodiments, updating the network, network topologies, failure modes, or network demand are also conditioned one or more of the same conditions as those defined in act 714, which is now discussed.

The next illustrated act of flowchart 700 is the act of waiting until predetermined criteria are met (act 714). The predetermined criteria can include a variety of different conditions or criteria, such as a passage of a threshold amount of time or period, receipt of a notification or user input, detecting a newly connected device or system, detecting a change in a configuration file, detecting a change in network capacity or network channel or link, the completion of an optimization step, such as act 712, and/or other triggering events.

The next illustrated act is the act of generating or determining a set of minimal link capacities for each updated network topology based on the updated network topology, updated failure modes, and updated network demand using a convex optimization algorithm (act 716). This act is similar to act 708, and can be performed in a similar fashion. It is noted, however, that act 708 is performed using the updated network topologies, updated failure modes, and updated network demand of act 712.

In some instances, the optimization algorithm utilized in act 716 is identical to the optimization algorithm used in act 708. In other embodiments, the optimization algorithm is modified by the changes to the constraints and objective function necessitated by the update to the network topologies, failure modes, and network demand.

The last act illustrated in the flowchart 700 is the act of identifying and selecting the network topology corresponding to the optimal set of minimal link capacities (act 718). This act is similar to act 710, described above, except that it is performed using the updated network topologies, updated failure modes, and updated network demand of act 712 and the new optimal sets of minimal link capacities found in act 716.

It will be appreciated that many of the acts depicted in FIG. 7 may be performed iteratively, such as shown with regard to the arrow pointing from act 718 to act 712. This is indicative of the automated functionality provided by the methods described in reference to flowchart 700 (as opposed to what is currently shown in reference to flowchart 600). This automated functionality is particularly beneficial, in some instances for facilitating dynamic and continuous optimizations of a network.

It will be appreciated that this iterative process (e.g., acts 712-718) is distinguished from the iterative non-convex and greedy algorithm processes described in reference to FIG. 4. In particular, the processes described in reference to FIG. 7 utilize a convex algorithm that still provides distinct advantages (in some instances) over those described in reference to FIG. 4, such as improved optimization and identification of network link capacities for the optimized networks.

As described in reference to FIG. 6, the flowchart 700 may be performed in any combination of actual and/or simulated network configurations.

What is claimed is:

1. A computer system comprising:
one or more processors; and
one or more hardware storage devices having stored thereon instructions that are executable by the one or more processors to configure the computer system to generate one or more sets of minimal link capacities and identify a particular set of minimal link capacities, including instructions that are executable to configure the computer system to perform at least the following:
obtain network traffic demand for a network, the network traffic demand describing a link capacity that the network needs to support;
obtain a plurality of different network topologies for the network, each network topology describing a different configuration of links and devices for the network;
obtain a plurality of failure scenarios for the network, including obtaining at least one failure scenario corresponding to each of the plurality of different network topologies, each failure scenario describing how the links and devices in the corresponding network topology can fail;
generate a group of sets of minimal link capacities for the plurality of different network topologies, including generating a set of optimized minimal link capacities for each of the plurality of different network topologies, by analyzing the network using an optimization technique that determines the set of optimized minimal link capacities for the network topology based on the network traffic demand for the network, the at least one failure scenario for the network topology, and the configuration of links and devices described for the network topology, each generated set of optimized minimal link capacities capable of meeting all network demands across all obtained failure scenarios for the network topology;
identify a particular set of minimal link capacities from the group of sets of minimal link capacities, based on one or more predetermined optimality criteria;
identify a particular network topology corresponding to the identified particular set of minimal link capacities; and
provide the particular set of optimized minimal link capacities and the corresponding particular network topology.

2. The computer system of claim 1, wherein the optimization technique is a convex optimization technique.

3. The computer system of claim 1, wherein the optimization technique is configured to simultaneously solve for each set of optimized minimal link capacities for the plurality of failure scenarios.

4. The computer system of claim 1, wherein at least one failure scenario comprises a requirement on a number of link failures in one or more network topologies of the plurality of different network topologies.

5. The computer system of claim 1, wherein at least one network topology of the plurality of different network topologies comprises a plurality of copies of at least one common design pattern.

6. The computer system of claim 1, wherein a first predetermined optimality criterion of the one or more predetermined optimality criteria is a minimum net change in network resources and wherein identifying the particular set of minimal link capacities comprises at least comparing a net change in network resources of each network topology corresponding to each set of minimal link capacities of the group of sets of minimal link capacities.

7. The computer system of claim 6, wherein identifying the particular set of minimal link capacities further comprises identifying the particular set of minimal link capacities as a first set of minimal link capacities that satisfies the first predetermined optimality criterion.

8. The computer system of claim 6, wherein the minimum net change in network resources is based at least in part on a monetary cost associated with modifying the network based on a first network topology of the plurality of different network topologies.

9. The computer system of claim 1, wherein each of the plurality of different network topologies is associated with one or more shared risk link groups that each comprises a group of a plurality of network links that would fail if one link of the group fails.

10. The computer system of claim 1, wherein at least one failure scenario is associated with a service level agreement.

11. A computer system comprising:
one or more processors; and
one or more hardware storage devices having stored thereon instructions that are executable by the one or more processors to configure the computer system to perform network optimization and automatic network scaling in the network using global optimization across topology design and traffic engineering for the network, including instructions that are executable to configure the computer system to perform at least the following:

obtain network traffic demand for the network, the network traffic demand describing a link capacity that the network needs to support;

obtain a plurality of different network topologies for the network, each network topology describing a different configuration of links and devices for the network;

obtain a plurality of failure scenarios for the network, including obtaining at least one failure scenario corresponding to each of the plurality of different network topologies, each failure scenario describing how the links and devices in the corresponding network topology can fail;

generate a group of sets of minimal link capacities for the plurality of different network topologies, including generating a set of optimized minimal link capacities for each of the plurality of different network topologies, by analyzing the network using an optimization technique that determines the set of optimized minimal link capacities for the network topology based on the network traffic demand for the network, the at least one failure scenario for the network topology, and the configuration of links and devices described for the network topology, each generated set of optimized minimal link capacities capable of meeting all network demands across all obtained failure scenarios for the network topology;

identify a particular set of minimal link capacities from the group of sets of minimal link capacities, based on one or more predetermined optimality criteria;

identify a particular network topology corresponding to the identified particular set of minimal link capacities; and create an updated network by updating the network based on the particular set of minimal link capacities.

12. The computer system of claim 11, wherein the optimization technique is a convex optimization technique.

13. The computer system of claim 11, wherein the optimization technique is configured to simultaneously solve for each set of minimal link capacities for the plurality of failure scenarios.

14. The computer system of claim 11, wherein creating the updated network comprises at least requisitioning new network resources defined in the network topology corresponding to the particular set of minimal link capacities.

15. The computer system of claim 11, wherein each of the plurality of different network topologies is associated with one or more shared risk link groups that each comprises a group of a plurality of network links that would fail if one link of the group fails.

16. The computer system of claim 11, wherein at least one failure scenario is associated with a service level agreement.

17. A method, implemented at a computer system that includes one or more processors, for network optimization and automatic network scaling in a network using global optimization across topology design and traffic engineering for the network, the method comprising:

obtaining network traffic demand for the network, the network traffic demand describing a link capacity that the network needs to support;

obtaining a plurality of different network topologies for the network, each network topology describing a different configuration of links and devices for the network;

obtaining a plurality of failure scenarios for the network, including obtaining at least one failure scenario corresponding to each of the plurality of different network topologies, each failure scenario describing how the links and devices in the corresponding network topology can fail;

generating a group of sets of minimal link capacities for the plurality of different network topologies, including generating a set of optimized minimal link capacities for each of the plurality of different network topologies, by analyzing the network using an optimization technique that determines the set of optimized minimal link capacities for the network topology based on the network traffic demand for the network, the at least one failure scenario for the network topology, and the configuration of links and devices described for the network topology, each generated set of optimized minimal link capacities capable of meeting all network demands across all obtained failure scenarios for the network topology;

identifying a particular set of minimal link capacities from the group of sets of minimal link capacities, based on one or more predetermined optimality criteria;

identifying a particular network topology corresponding to the identified particular set of minimal link capacities; and creating an updated network by updating the network based on the particular set of minimal link capacities.

18. The method of claim 17, wherein the optimization technique is a convex optimization technique.

19. The method of claim 17, wherein the optimization technique is configured to simultaneously solve for each set of minimal link capacities for the plurality of failure scenarios.

20. The method of claim 17, wherein creating the updated network comprises at least requisitioning new network resources defined in the network topology corresponding to the particular set of minimal link capacities.

* * * * *